United States Patent [19]

Peiffer et al.

[11] 4,427,812
[45] Jan. 24, 1984

[54] INTERFACIAL VISCOSIFICATION OF SALT WATER SYSTEMS UTILIZING SULFONATED IONOMERS

[75] Inventors: Dennis G. Peiffer, East Brunswick; Robert D. Lundberg, Bridgewater, both of N.J.; Thad O. Walker, Humble, Tex.

[73] Assignee: Exxon Research and Engineering Co., Florham Park, N.J.

[21] Appl. No.: 374,251

[22] Filed: May 3, 1982

[51] Int. Cl.³ .............................................. C08L 91/00
[52] U.S. Cl. ............................ 524/115; 260/DIG. 31; 524/140; 524/210; 524/233; 524/356; 524/366; 524/565; 524/570; 524/574; 524/577
[58] Field of Search ............... 260/DIG. 31; 524/576, 524/115, 140, 210, 233, 356, 366, 565, 570, 574, 577

[56] References Cited

U.S. PATENT DOCUMENTS

| | | | |
|---|---|---|---|
| 3,642,728 | 2/1972 | Canter | 525/379 |
| 3,836,511 | 9/1974 | O'Farrell et al. | 260/DIG. 31 |
| 3,847,854 | 11/1974 | Canter et al. | 260/DIG. 31 |
| 3,870,841 | 3/1975 | Makowski et al. | 524/132 |
| 4,118,361 | 10/1978 | Lundberg | 524/576 |
| 4,220,573 | 9/1980 | Bock et al. | 524/576 |
| 4,282,130 | 8/1981 | Lundberg et al. | 524/389 |
| 4,322,329 | 3/1982 | Lundberg et al. | 524/576 |
| 4,361,658 | 11/1982 | Lundberg et al. | 523/132 |

Primary Examiner—Ronald W. Griffin
Attorney, Agent, or Firm—Richard D. Nanfeldt

[57] ABSTRACT

The present invention relates to a process for the gelation (i.e. thickening) of salt water which includes the steps of forming a solvent system of an organic liquid or oil and a polar cosolvent, the polar cosolvent being less than about 15 weight percent of the solvent system, a viscosity of the solvent system being less than about 100 cps; dissolving a nonionic surfactant and water insoluble, neutralized or unneutralized sulfonated polymer in the solvent system to form a solution, a concentration of the neutralized, or unneutralized sulfonated polymer in the solution being about 0.01 to about 0.5 weight percent, the concentration of the nonionic surfactant in the solvent system being about 0.0001 to about 1.0 weight percent, a viscosity of the solution being less than about 2,000 cps; and admixing or contacting said solution with about 5 to about 500 volume precent of salt water, the salt water being immiscible with the organic liquid and the polar cosolvent, nonionic surfactant and the water insoluble, neutralized or unneutralized sulfonated polymer transferring from the organic liquid to the salt water phase, thereby causing the salt water phase to gel.

19 Claims, No Drawings

INTERFACIAL VISCOSIFICATION OF SALT WATER SYSTEMS UTILIZING SULFONATED IONOMERS

BACKGROUND OF THE INVENTION

1. Field of the Invention

The present invention relates to a process for the viscosification of salt water solutions which includes the steps of forming a solvent system of an organic liquid or oil and a polar cosolvent, the polar cosolvent being less than about 15 weight percent of the solvent system, the viscosity of the solvent system being less than about 100 cps; dissolving a nonionic surfactant and a water insoluble, neutralized or unneutralized sulfonated polymer in the solvent system to form a solution, the concentration of the water insoluble, neutralized or unneutralized sulfonated polymer in the solution being about 0.01 to about 0.5 weight percent, the concentration of the nonionic surfactant in the solvent system being about 0.001 to about 1.0 weight percent, and the viscosity of the solution being less than about 200 cps. Admixing or contacting said solution with about 5 to about 500 volume percent of salt water, the salt water being immiscible with the organic liquid and the polar cosolvent and the nonionic surfactant and water insoluble, neutralized or unneutralized sulfonated polymer transferring from the organic liquid to the salt water phase, thereby causing the salt water phase to gel.

2. Description of the Prior Art

There are many applications for very viscous or gelled solutions of polymers in salt water which are quite diverse. There are also a number of physical and chemical techniques for preparing such systems. The present invention is concerned with a process for gelling (i.e. thickening) a salt water system by contacting the aqueous system with a relatively low viscosity, organic liquid solution of an ionic polymer.

The instant invention differs from a number of applications, Ser. Nos. 223,482, now U.S. Pat. No. 4,361,658; 136,837, now U.S. Pat. No. 4,322,329; and 106,027, now U.S. Pat. No. 4,282,130, filed by Robert Lundberg et al., one of the instant inventors. These previously filed applications were directed to the gelling of the organic liquid by a water insoluble, neutralized or unneutralized sulfonated polymer whereas the instant invention is directed to the gelling of the salt water phase. Quite unexpectedly, it has been discovered that when the concentration of the water insoluble, neutralized or unneutralized sulfonated polymer is maintained in a critical concentration range of 0.01 to 0.5 weight percent of the total volume of solvent, wherein the system contains a nonionic surfactant which is a mixture of nonpolar organic liquid and a polar cosolvent, upon the addition of salt water, a transfer of the polar solvent and water insoluble neutralized or unneutralized sulfonated polymer and nonionic surfactant from the nonpolar organic liquid phase to the salt water phase occurs. The water insoluble, neutralized or unneutralized sulfonated polymer causes the salt water phase to gel, wherein the neutralized or unneutralized sulfonated polymer is insoluble in the salt water phase. In the previously filed patent applications, substantial viscosification of the nonpolar organic liquid phase did not occur until the concentration of the water insoluble, neutralized or unneutralized sulfonated polymer was sufficiently high enough to permit chain entanglement of adjacent polymer molecules thereby completely filling the solvent space. The gelation of the salt water of the instant invention does not occur by this previously described mechanism because the resultant concentration of water insoluble, neutralized or unneutralized sulfonated polymer is not sufficiently high enough to permit chain entanglement. The mechanism of gelation of the salt water, as defined in the instant invention, occurs by the formation of macroscopic, spherical polymer membranes or films dispersed throughout the salt water, wherein large volumes of the salt water of the aqueous liquid are encapsulated within a series of minute polymer bags.

The instant invention describes a process which permits (1) the preparation of polymer solutions of water insoluble, neutralized or unneutralized sulfonated polymers in organic liquid having reasonably low viscosities (i.e., less than about 200 cps); and (2) the preparation of extremely viscous solutions or gels of salt water from such solutions by a process of mixing or contacting salt water with the polymer solution. These operations are achieved by the use of the appropriate concentration; 0.01 to 0.5 weight percent of water insoluble, neutralized or unneutralized sulfonated polymers, having low concentrations of ionic groups present, preferably metal sulfonate groups. Such polymers are described in detail in a number of U.S. Pat. Nos. 3,836,511; 3,870,841; 3,847,854; 3,642,728; and 3,931,021) which are herein incorporated by reference. These polymers possess unusual solution characteristics some of which are described in U.S. Pat. No. 3,931,021. Specifically, these polymers, such as lightly sulfonated polystyrene, containing about 2 mole percent sodium sulfonate pendant to the aromatic groups, are typically not soluble in solvents commonly employed for polystyrene itself. However, the incorporation of modest levels of polar cosolvents permit the rapid dissolution of such ionic polymers to form homogeneous solutions of moderate viscosity.

In the instant process, the role of the polar cosolvent is that of solvating the ionic groups while the main body of the solvent interacts with the polymer backbone. For example, xylene is an excellent solvent for the polystyrene backbone and when combined with 5 percent methanol will dissolve, readily and rapidly, the previous example of lightly sulfonated polystyrene.

The remarkable and surprising discovery of the instant invention is that when small (or large) amounts of salt water are combined and mixed with solutions of water insoluble, ionic polymers dissolved at low concentrations (0.01 to 0.5 weight percent) in such mixed solvent systems as those described above, a phase transfer of the water insoluble, neutralized or unneutralized sulfonated polymer, nonionic surfactant, and cosolvent occurs from the nonpolar organic liquid phase to the salt water phase, wherein the salt water phase gels. Indeed, it is possible to achieve increases in viscosity of the salt water phase by factors of $10^3$ (1,000) or more by the addition of only 5 to 15 percent salt water based on the polymer solution volume. This unusual behavior is postulated to arise from the removal of the polar cosolvent, water insoluble, neutralized or unneutralized sulfonated polymer and nonionic surfactant from the organic liquid phase into the separate salt water phase, which then gels.

SUMMARY OF THE INVENTION

The present invention relates to a process for the gelation of salt water which includes the steps of forming a solvent system of an organic liquid or oil and a polar cosolvent. The polar cosolvent being less than about 15 weight percent of the solvent system with a viscosity of the solvent system being less than about 100 cps; subsequently dissolving a nonionic surfactant and a water insoluble, neutralized or unneutralized sulfonated polymer in the solvent system to form a solution with the concentration of the water insoluble, neutralized or unneutralized sulfonated polymer in the solution being about 0.01 to about 0.5 weight percent, the concentration of the nonionic surfactant in the solvent system being about 0.0001 to about 1.0 weight percent, the viscosity of the solution being less than about 2,000 cps. Admixing or contacting said solution with about 5 to about 500 volume percent of salt water, the salt water being immiscible with the organic liquid and the polar cosolvent, nonionic surfactant and the water insoluble, neutralized or unneutralized sulfonated polymer transferring from the organic liquid to the salt water phase, thereby causing the salt water phase to gel (i.e. thicken).

Accordingly, it is a primary object of the instant invention to describe an economical process for forming a highly viscous or gelled salt water having a viscosity from about 50 cps to about 1,000 cps.

GENERAL DESCRIPTION

The present invention relates to a process for the gelation of salt water which includes the steps of forming a solvent system of an organic liquid or oil and a polar cosolvent. The polar cosolvent being less than about 15 weight percent of the solvent system, the viscosity of the solvent system being less than about 100 cps; dissolving a nonionic surfactant and a water insoluble, neutralized or unneutralized sulfonated polymer in the solvent system to form a solution, the concentration of the water insoluble, neutralized or unneutralized sulfonated polymer in the solution being about 0.01 to about 0.5 weight percent, the concentration of the nonionic surfactant in the solvent system being about 0.0001 to about 1.0 weight percent, the viscosity of the solution being less than about 200 cps; and admixing or contacting said solution with about 5 to about 500 volume percent of salt water, the salt water being immiscible with the organic liquid and the polar cosolvent, nonionic surfactant and the water insoluble, neutralized or unneutralized sulfonated polymer transferring from the organic liquid to the salt water phase, thereby causing the salt water phase to gel.

The gelled salt water having a viscosity greater than 50 cps is formed by the addition of salt water to a water insoluble solution which comprises a nonionic surfactant, a water insoluble, neutralized or unneutralized sulfonated polymer, a nonpolar organic liquid and a polar cosolvent, wherein the water insoluble solution has a viscosity less than 200 cps, the concentration of the water insoluble, neutralized or unneutralized sulfonated polymer is 0.01 to 0.5 weight percent and the concentration of the nonionic surfactant is about 0.0001 to about 1.0 weight percent. Upon the addition of salt water to the solution, the polar cosolvent, nonionic surfactant and water insoluble, neutralized or unneutralized sulfonated polymer rapidly transfers from the solution to the salt water phase which undergoes immediate gelation. The nonpolar organic liquid can be removed from the gel by conventional liquid extraction methods. The formation of the gelled salt water, having a viscosity of at least 50 cps from the solution having a viscosity less than 200 cps, can be quite rapid in the order of less than 1 minute to about 24 hours, more preferably less than 1 minute to about 30 minutes, and most preferably less than 1 minute to about 10 minutes; however, this depends on temperature, shear, solvent type, etc.

The component materials of the instant process generally include a water insoluble, ionomeric polymer such as a water insoluble, neutralized or unneutralized sulfonated polymer at a critical concentration level of 0.01 to 0.5 weight percent, a nonpolar organic liquid, polar cosolvent, a nonionic surfactant and salt water.

Gelation of salt water does not occur, if one employs a conventional unsulfonated polymer or a water soluble, neutralized sulfonated polymer in place of the water insoluble, neutralized or unneutralized sulfonated polymer, but rather only classical phase separation occurs.

In the instant invention, the gelation of the salt water phase occurs by the formation of geometrically shaped spheres of the water insoluble, neutralized or unneutralized sulfonated polymer within the salt water phase, wherein the salt water is encapsulated within these geometrically shaped spheres (so-called water-in-water pseudo-emulsions). During the process, approximately 10 weight percent of the nonpolar organic liquid also transfers to the salt water phase and is encapsulated within these geometrically shaped spheres.

When the water insoluble ionomeric polymer is used alone and not in combination with a nonionic surfactant, gelation of the salt water does not occur. Moreover, when the nonionic surfactant is used alone and not in combination with a sulfonated ionomer, gelation of the salt water does not take place. More specifically, it has been found that a suitable nonionic surfactant must be employed with the water insoluble sulfonated polystyrene to give formulations which are effective in producing these water-in-water pseudo-emulsions in high concentrations of salt water.

In general, the water insoluble ionomeric polymer will comprise from about 10 to about 200 meq. pendant ionomeric groups per 100 grams of polymer, more preferably from 10 to 100 meq. pendant ionomeric groups. The ionic groups may be conveniently selected from the groups consisting of carboxylate, phosphonate, and sulfonate, preferably sulfonate groups. In most instances, the ionomers utilized in the instant invention are neutralized with the basic materials selected from Groups IA, IIA, IB and IIB of the Periodic Table of Elements and lead, tin and antimony, as well as ammonium and amine counterions. Ionic polymers which are subject to the process of the instant invention are illimitable and include both plastic and elastic polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers. The preferred polymers of the instant invention are ethylene-propylene terpolymers and polystyrene, wherein polystyrene is most preferred.

Neutralization of the cited polymers with appropriate metal hydroxides, metal acetates, metal oxides, or ammonium hydroxide etc., can be conducted by means well-known in the art. For example, the sulfonation process as with Butyl rubber containing a small 0.3 to 1.0 mole percent unsaturation can be conducted in a suitable solvent such as toluene, with acetyl sulfate as the sulfonated agent, such as described in U.S. Pat. No. 3,836,511. The resulting sulfonic acid derivative can then be neutralized with a number of different neutralization agents such as a sodium phenolate and similar metal salts. The amounts of such neutralization agents employed will normally be equal stoichiometrically to the amount of free acid in the polymer plus any unreacted reagent which is still present. It is preferred that the amount of neutralizing agent be equal to the molar amount of sulfonating agent originally employed plus 10 percent more to insure full neutralization. The use of more of such neutralization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected.

The degree of neutralization of said ionomeric groups may vary from 0 (free accid form) to greater than 100 mole percent, preferably 50 to 100 percent. With the utilization of neutralized ionomers in this instant invention, it is preferred that the degree of neutralization be substantially complete, that is with no substantial free acid present and without substantial excess of the base other than that needed to insure neutralization. The neutralized ionomers possess greater thermal stability compared to its acid form. Thus, it is clear that the polymers which are normally utilized in the instant invention comprise substantially neutralized pendant groups, and in fact, an excess of the neutralizing material may be utilized without defeating the objects of the instant invention.

The ionomeric polymers of the instant invention may vary in number average molecular weight from 1,000 to 10,000,000 preferably from 5,000 to 500,000, most preferably from 10,000 to 200,000. These polymers may be prepared by methods known in the art, for example, see U.S. Pat. No. 3,642,728, hereby incorporated by reference.

The preferred ionic copolymers for use in the instant invention, e.g., sulfonated polystyrene and substituted derivatives thereof, may be prepared by the procedures described in U.S. Pat. No. 3,870,841, filed Oct. 2, 1972, in the names of H. S. Makowski, R. D. Lundberg and G. H. Singhal, hereby incorporated by reference.

The water insoluble, ionomeric polymers may be incorporated into the organic liquid at a level of from 0.01 to 0.5 weight percent and more preferably from 0.01 to 0.4 weight percent, based on the organic liquid and the polar cosolvent.

Specific examples of preferred ionomeric polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated polypropylene copolymers, sulfonated styrene methyl methacrylate copolymers, (styrene)-acrylic acid copolymers, sulfonated polyisobutylene, sulfonated ethylene-propylene terpolymers, sulfonated polyisoprene, sulfonated polyvinyl toluene and sulfonated polyvinyl toluene copolymers.

The ionomeric polymers of the instant invention may be prepared prior to incorporation into the organic solvent, or by neutralization of the acid from a situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

It is also possible to neutralize the acid form of these polymers in situ; however, this is not a preferred operation, since in situ neutralization requires preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic liquid.

The nonionic surfactants which can be employed in the instant invention are selected from the group consisting of polyethylene oxide-polypropylene oxide-block copolymer (polyols), polyoxyethylene sorbitan fatty acid esters, sorbitan fatty acid esters, fatty acids and fatty acid derivatives such as ethoxylated fatty acid-Armals (Ethofat ®), amide derivatives such as Armals (Ethomid ®), stearatic acid and stearate derivatives, fluorine-containing nonionic surfactants, fatty alcohols, alcohol esters, glycinol esters and polyethylene glycol esters. Typical examples of nonionic surfactants are BASF (Pluronics ®), ICI (Atlas ®), ICI (Bris ®) and ICI (Arlacel ®), ICI (Tween ®series), 3M (Fluorad ®) and Shenex (Adol ®), wherein polyethylene oxide-polypropylene oxide-block copolymer (polyols) is preferred. The concentration of nonionic surfactant in the solvent system is about 0.0001 to about 1.0 weight percent, more preferably about 0.001 to about 0.5 weight percent, and most preferably about 0.001 to about 0.005 weight percent.

The organic liquids, which may be utilized in the instant invention, are selected with relation to the ionic polymer and vice-versa. The organic liquid is selected from the group consisting essentially of aromatic hydrocarbons, cyclic aliphatic ethers, aliphatic ethers, or organic aliphatic esters and mixtures thereof.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylene dichloride, |

-continued

| Polymer | Organic Liquid |
|---|---|
| sulfonated poly-t-butyl-styrene | methylene chloride. benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvents, oils such as Solvent "100 Neutral", "150 Neutral" and similar oils, benzene, diesel oil, toluene, xylene, ethyl benzene, pentane, hexane, heptane, octane, isooctane, nonane, decane aromatic solvents, ketone solvents. |
| sulfonated styrene-methyl-methacrylate copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons. "Solvent 100 Neutral", "Solvent 150 Neutral" and all related oils, low molecular weight polymeric oils such as squalene, white oils and process oils having 60 percent or less aromatic content. |
| sulfonated polyvinyl toluene | toluene, benzene, xylene, cyclohexane ethyl benzene, styrene, methylene chloride, ethylene dichloride. |

The method of the instant invention includes incorporating a polar cosolvent, for example, a polar cosolvent in the mixture of organic liquid and water insoluble ionomer to solubilize the pendant ionomeric groups. The polar cosolvent will have a solubility parameter of at least 10.0, more preferably at least 11.0 and is water miscible and may comprise from 0.1 to 15.0 weight percent, preferably 0.1 to 5.0 weight percent of the total mixture of organic liquid, water insoluble ionomeric polymer, and polar cosolvent. The solvent system of polar cosolvent and organic liquid in which the water insoluble, neutralized sulfonated (ionomeric) polymer is dissolved contains less than about 10.0 weight percent of the polar cosolvent, more preferably about 0.1 to about 5.0 weight percent, and most preferably about 1.0 to about 5.0 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or trifunctional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol, and n-ethylformamide.

The amount of salt water added to the solution of neutralized sulfonated polymer, organic liquid and polar cosolvent having a viscosity of less than about 2,000 cps, is about 5 to about 500 volume percent of salt water, more preferably about 10 to about 300 volume percent of salt water, most preferably about 10 to about 200 volume percent of salt water.

DETAILED DESCRIPTION OF THE PREFERRED EMBODIMENT

The following examples will demonstrate the performance of sulfonated polystyrene of varying sulfonate levels in several specific aqueous salt environments.

EXAMPLE 1

Table I shows the effectiveness of a pseudo-emulsion system in viscosifying a saturated calcium chloride solution. A nonionic surfactant (BASF-Pluronic ®F-108), at very low concentrations, was utilized in the preparation of the pseudo-emulsion system. The data indicates that this salt solution containing pseudoemulsion spheres in conjugation with minute amounts of nonionic surfactant can be used to significantly enhance the viscosity of the salt solution even though the polymer is wholly hydrocarbon soluble. Moreover, the data shows that these pseudo-emulsion systems can be produced over a wide range of "dilution" with relatively minor modification in viscosity.

EXAMPLE 2

Table II shows the effectiveness of a pseudoemulsion system as a viscosifier for a sodium chloride solution (2 weight percent sodium chloride). A nonionic surfactant (BASF-Pluronic ®F-108), at a very low level, was used in the preparation of the pseudo-emulsion. The data shows these aqueous salt solutions containing pseudo-emulsion particles can be used to significantly enhance the viscosity of the aqueous solution. Moreover, as the temperature is increased, little change in viscosity is found. This isoviscous effect can be attributed to the thermal stability of the pseudo-emulsion particles in this temperature range. In saturated calcium chloride solutions, similar temperature behavior is observed (Table III).

TABLE I

| EFFECT OF SATURATED CaCl$_2$ SOLUTION | |
|---|---|
| Solution Volume (ml)* | Viscosity (cps)** |
| 30 | 176 |
| 40 | 196 |
| 50 | 152 |

*Initial nonionic surfactant concentration - 0.004 g/l.
**Viscosity measured at 30 rpm.

TABLE II

| VISCOSITY (30 RPM) OF PSEUDO-EMULSION* FORMED IN 2% NaCl SOLUTION VERSUS TEMPERATURE (0.04 G/L NONIONIC SURFACTANT) | |
|---|---|
| Temperature (°C.) | Viscosity (cps) |
| 25 | 482 |
| 40 | 175 |
| 55 | 145 |
| 65 | 145 |

TABLE II-continued

VISCOSITY (30 RPM) OF PSEUDO-EMULSION* FORMED IN 2% NaCl SOLUTION VERSUS TEMPERATURE (0.04 G/L NONIONIC SURFACTANT)

| Temperature (°C.) | Viscosity (cps) |
| --- | --- |
| 75 | 105 |

*Initial polymer concentration in xylene: 15 ml. at 0.5 g/l of 6.05 mole % sulfo-polystyrene. Volume of aqueous phase is 25 ml.

TABLE III

VISCOSITY (30 RPM) OF PSEUDO-EMULSION (NaSPS) FORMED IN SATURATED $CaCl_2$ SOLUTION VERSUS TEMPERATURE (0.08 G/L NONIONIC SURFACTANT)

| Temperature (°C.) | Viscosity (cps) |
| --- | --- |
| 25 | 305 |
| 40 | 500 |
| 55 | 345 |
| 70 | 150 |

What is claimed is:

1. A process for forming a thickened salt water solution having a viscosity of at least about 50 cps which includes the steps of:
   (a) forming a solvent system of an organic liquid and a polar cosolvent, said polar cosolvent being less than about 15 weight percent of said solvent system, the viscosity of said solvent system being less than about 100 cps;
   (b) dissolving a water insoluble unneutralized or neutralized sulfonated polymer in said solvent system to form a solution, the concentration of said unneutralized or neutralized sulfonated polymer in said solution being about 0.01 to about 0.5 weight percent, the viscosity of said solution being less than about 200 cps;
   (c) dissolving a nonionic surfactant in said solution, the concentration of said nonionic surfactant being about 0.0001 to about 1.0 weight percent; and
   (d) adding about 5 to about 500 volume percent of salt water to said solution, said water and said solution being immiscible, said polar cosolvent, said nonionic surfactant and said water insoluble, neutralized or unneutralized sulfonated polymer transferring from said organic liquid to said salt water thereby causing the viscosity of said salt water to increase to at least 50 cps.

2. A process according to claim 1 further including a means for removing said organic liquid from said salt water fluid.

3. A process according to claim 1, wherein said unneutralized or neutralized sulfonated polymer has about 10 (free acid) to about 200 meq. of pendant $SO_3H$ groups per 100 grams of polymer.

4. A process according to claim 3 wherein said $SO_3H$ groups are neutralized within an ammonium or metal counterion.

5. A process according to claim 4 wherein said metal counterion is selected from the group including antimony, tin, lead or Groups IA, IIA, IB or IIB of the Periodic Table of Elements.

6. A process according to claim 4 wherein said $SO_3H$ groups are at least 90 mole percent neutralized.

7. A process according to claim 1 wherein said neutralized or unneutralized sulfonated polymer is formed from an elastomeric polymer.

8. A process according to claim 7 wherein said elastomeric polymer is selected from the group including EPDM terpolymer or Butyl rubber.

9. A process according to claim 1 wherein said neutralized or unneutralized sulfonated polymer is formed from a thermoplastic.

10. A process according to claim 9 wherein said thermoplastic is selected from the group including polystyrene, t-butyl styrene, ethylene copolymers, propylene copolymers, or styrene/acrylonitrile copolymer.

11. A process according to claim 1 wherein said polar cosolvent has a greater polarity than said organic liquid.

12. A process according to claim 1 wherein said polar cosolvent is selected from the group including aliphatic alcohols, aliphatic amines, di- or trifunctional aliphatic alcohols, water miscible amides, acetamides, phosphates, or lactones and mixtures thereof.

13. A process according to claim 1 wherein said polar cosolvent is selected from the group including methanol, ethanol, propanol, isopropanol and mixtures thereof.

14. A process according to claim 1 wherein said polar cosolvent has a solubility parameter of at least about 10 and is water miscible.

15. A process according to claim 1 wherein said organic liquid is selected from the group including aromatic hydrocarbons, ketones, chlorinated aliphatic hydrocarbons, aliphatic hydrocarbons, cyclic aliphatic ethers, aliphatic ethers or organic aliphatic esters and mixtures thereof.

16. A process according to claim 1 wherein said organic liquid is selected from the group including aliphatic hydrocarbons or aromatic hydrocarbons.

17. A process according to claim 1 wherein said organic liquid is selected from the group including benzene, toluene, ethyl benzene, xylene or styrene and mixtures thereof.

18. A process according to claim 17 wherein said neutralized or unneutralized sulfonated polymer is formed from polystyrene.

19. The product prepared by the process of claim 1.

* * * * *